(12) United States Patent
Wei et al.

(10) Patent No.: US 7,710,829 B2
(45) Date of Patent: May 4, 2010

(54) RSSI AND ULTRASONIC BASED HYBRID RANGING TECHNOLOGY

(75) Inventors: Qiang Wei, Beijing (CN); Xuwen Yu, Beijing (CN)

(73) Assignee: Panasonic Corporation, Osaka (JP)

( * ) Notice: Subject to any disclaimer, the term of this patent is extended or adjusted under 35 U.S.C. 154(b) by 342 days.

(21) Appl. No.: 11/909,028

(22) PCT Filed: Mar. 29, 2006

(86) PCT No.: PCT/CN2006/000544

§ 371 (c)(1),
(2), (4) Date: Sep. 18, 2007

(87) PCT Pub. No.: WO2006/102844

PCT Pub. Date: Oct. 5, 2006

(65) Prior Publication Data

US 2009/0231958 A1 Sep. 17, 2009

(30) Foreign Application Priority Data

Mar. 29, 2005 (CN) .......................... 2005 1 0062546

(51) Int. Cl.
*G01S 5/00* (2006.01)
(52) U.S. Cl. ..................................................... 367/128
(58) Field of Classification Search .................. 367/128; 342/125, 145
See application file for complete search history.

(56) References Cited

U.S. PATENT DOCUMENTS 4,924,450 A 5/1990 Brashear et al.

| | | | | |
|---|---|---|---|---|
| 6,680,688 B1 * | 1/2004 | Jiang et al. | .................. | 367/128 |
| 7,031,224 B2 * | 4/2006 | Reifer | .......................... | 367/128 |
| 7,362,656 B2 * | 4/2008 | Holm | .......................... | 367/128 |
| 2004/0133535 A1 | 7/2004 | Scharler et al. | | |

FOREIGN PATENT DOCUMENTS

JP 2003-134027 5/2003

OTHER PUBLICATIONS

International Search Report Jun. 22, 2006.

* cited by examiner

*Primary Examiner*—Ian J Lobo
(74) *Attorney, Agent, or Firm*—RatnerPrestia (57) ABSTRACT

Disclosed is a hybrid ranging method comprising the steps of: transmitting from a first node an ultrasonic signal and a radio signal comprising at least one radio synchronization signal with a predetermined ratio; calculating, at a second node, a ultrasonic transmission time period between the receipt of the radio synchronization signal and the receipt of the ultrasonic signal; calculating, at the second node, an ultrasonic measured result between the first node and the second node by using the ultrasonic transmission time period; calculating, at the second node, the strength of the received radio signal, and obtaining a radio measured result between the first node and the second node from a reference database; calculating, at the second node, the smoothness of the ultrasonic measured result and the radio measured result; and determining at the second node, a final measured result according to the smoothness of the ultrasonic measured result and the radio measured result.

12 Claims, 5 Drawing Sheets

Fig. 7

RSSI AND ULTRASONIC BASED HYBRID RANGING TECHNOLOGY

FIELD OF THE INVENTION

The present invention relates to a wireless ranging method for accurately and quickly measuring distance indoor, which can be used for localizing nodes by measuring the distance between nodes, particularly, to a ranging technology combining the RSSI based ranging and TDOA based ranging technologies which is capable of improving measuring speed and accuracy of the wireless ranging indoor.

PRIOR ARTS RELATED TO THE INVENTION

The technology of localization indoor, which is an effective monitoring and controlling technology, has been widely used in the various aspects. With the developing of the microelectromechanical technology and wireless network technology, it is possible to arrange localization network to obtain position of devices to be applied a new service. As the popularizing of various applications of the localization system, further demands for the performances thereof occur. These demands greatly prompt the development of the accurate, quick and power-saving localization technology.

The existing ranging technologies are TOA (Time of Arrival), TDOA (Time Difference of Arrival), AOA (Angle of Arrival), RSSI (Received Signal Strength Indicator) and the like. In the technologies above described, the RSSI based technology has an advantage of high speed, but would be affected by the environment indoor. Thus, this method needs an environment information database. The TDOA based technology has an advantage of high accuracy, but has a disadvantage of strong directionality and needs to perform ultrasonic communication frequently, that is, consuming more power.

Figure 1:
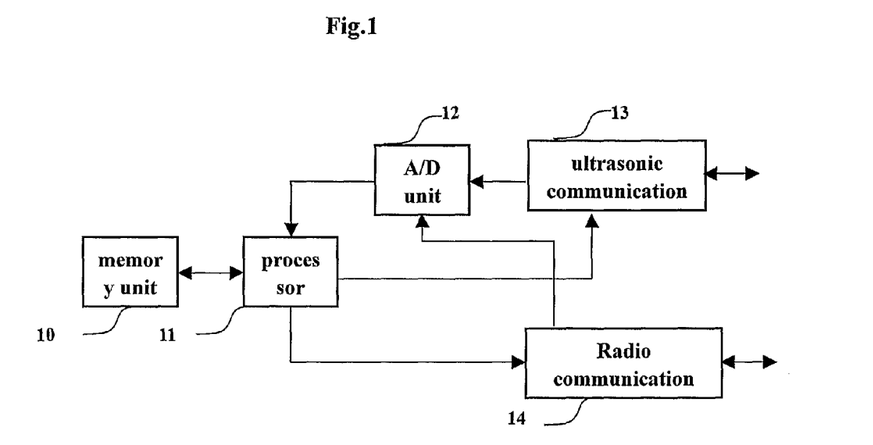
FIG. 1 shows a structure diagram of existing node that has ultrasonic and radio communication functions.

FIG. 1 shows a structure diagram of existing node that has ultrasonic wave and radio communication functions. As shown in FIG. 1, the node comprises a memory unit 10 for storing data, a processor unit 11 connected with the memory unit, a ultrasonic communication unit 13 for performing ultrasonic communication with the external device, a A/D unit 12 for converting the analogy signals from the ultrasonic communication unit 13 and the radio communication unit 14 into digital signals and send them to the processor unit 11.

To implement the localization using sensor network nodes, the positions of given nodes in the network must be known previously. In order to identify the positions of the given nodes, according to triangle localization principle, the distances between three known fixed-nodes and unknown nodes must be known. The present invention is directed to how to accurately measure the distances between the unknown nodes and the fixed nodes by using wireless signals.

Figure 2:
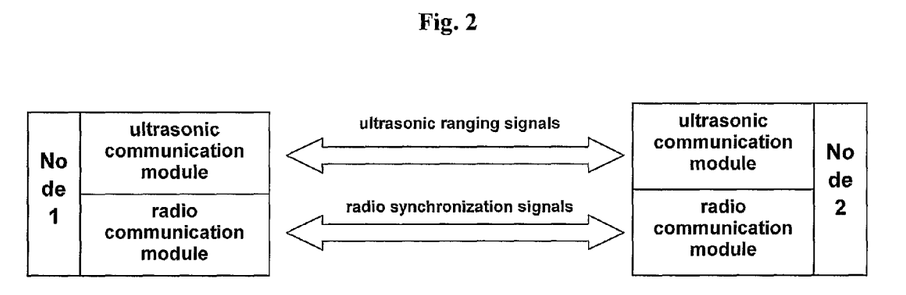
FIG. 2 shows a diagram for illustrating the existing ultrasonic ranging method.

FIG. 2 shows a diagram for illustrating the existing ultrasonic ranging method. In the case of TDOA based ultrasonic ranging method, suppose node 1 is an ultrasonic and radio signals transmission terminal while the node 2 is a receiving terminal. The ranging process will be described as below:

a) node 1 transmits a radio synchronization signal and an ultrasonic signal;

b) node 2 starts a clock to get the time when the radio synchronization signal is received as a start time $T_s$;

c) node 2 stops the clock to get the time when the ultrasonic signal is received as an end time $T_e$, and then calculates the ultrasonic transmission time period $T_D = T_e - T_s$;

d) the distance D between node 1 and node 2 is calculated according to the following equation:

$$D = T_D \times V_{sound} \tag{1}$$

wherein $V_{sound}$ denotes the speed of ultrasonic wave.

In the case of RSSI based ranging process, the radio waves are attenuated at different degrees. The RSSI based method calculates the transmission distance by measuring the strength of the received radio signals and by using the relations between attenuation of radio wave and transmission distance. Specifically, the number N of radio waves received in a certain time period and the total strength $S_N$ of the strengths $S_i$ of each waves are firstly calculated, and then the average $\overline{S}$ is calculated as the strength of the signals, as shown below:

$$\overline{S} = \frac{S_N}{N}, \tag{2}$$

wherein $$S_N = \sum_{i=1}^{N} S_i$$

After the calculation of the strength of signal, the strength is changed into distance according to a reference database in which relations between the strength of received signals and the transmission distances are stored.

These two methods have their own disadvantages. In the ultrasonic ranging method, the ultrasonic signals must be transmitted frequently. Thus, the more power will be consumed. Meanwhile, the measured results are not so accurate when the nodes are not in the direction of ultrasonic wave because the transmission of ultrasonic wave has a strong directionality.

In the radio ranging method, the measured results are strongly affected by the objects in the environment because of multi-path effect and NLOS (Non-Line-Of-Sight). In general, many systems need to create a reference database for describing the relations between signal strengths and distances under certain circumstances. When performing actual measurement, the distance can be obtained by referring to the relations stored in the database. The drawback of the method lies in that the update of the database is difficult when the environment is changed.

SUMMARY OF THE INVENTION

In view of the problems above described, the present invention is done. The present invention can overcome the drawbacks of the existing technologies, that is, multi-path effects, NLOS, strong directionality, low speed and more power consumption, so as to meet various demand from monitoring and controlling applications.

In an aspect of the invention, a hybrid ranging method comprising the steps of: transmitting from a first node an ultrasonic signal and a radio signal comprising at least one radio synchronization signal with a predetermined ratio therebetween; calculating, at a second node, a ultrasonic transmission time period between the receipt of the radio synchronization signal and the receipt of the ultrasonic signal; calculating, at the second node, an ultrasonic measured result between the first node and the second node by using the ultrasonic transmission time period; calculating, at the second node, the strength of the received radio signal, and obtaining a radio measured result between the first node and the second node from a reference database; calculating, at the second node, the smoothness of the ultrasonic measured result and the radio measured result; and determining, at the second node, a final measured result according to the smoothness of the ultrasonic measured result and the radio measured result.

In another aspect of the invention, a method for creating reference database comprising the steps of: transmitting radio synchronization signals and ultrasonic ranging signal from a first node simultaneously; calculating, at a second node, a ultrasonic transmission time period between the receipt of the radio synchronization signal and the receipt of the ultrasonic signal; calculating, at the second node, an ultrasonic measured result between the first node and the second node by using the ultrasonic transmission time period; calculating, at the second node, the strength of the received radio signal; storing the ultrasonic measured result and the strength of the radio signal into the memory correspondingly.

With the methods of the invention, the following technical effects can be obtained:

a) the hybrid ranging method can decrease the interference from the directionality in the ultrasonic ranging process;

b) the power consumption due to frequently transmission of ultrasonic signals is decreased;

c) the measuring speed is enhanced by intermittently using RSSI based measuring method to meet the demand of moving measurement.

d) the effects from the change of the environment is decreased by using ultrasonic ranging method;

e) the reference database for implementing real time RSSI based localization can be created by using ultrasonic ranging method.

DETAILED DESCRIPTION OF THE PREFERRED EMBODIMENTS

Figure 3:
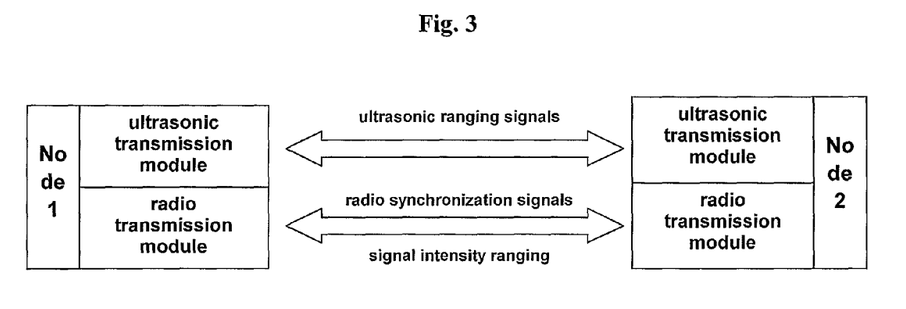
FIG. 3 depicts a diagram of the ranging system according to an embodiment of the present invention.

The hybrid ranging method combining ultrasonic ranging and radio ranging according to the present invention will be described below by way of preferred embodiments with reference to the drawings. FIG. 3 depicts a diagram of the ranging system according to an embodiment of the present invention.

While a node 1 is transmitting radio synchronization signal, an intensity of the radio signal is measured, and the measured result is used as a data source in order to calculate a distance between two nodes by using the radio intensity ranging principle. Thereafter, another distance is calculated by a detected ultrasonic signal. After obtaining these two measured results, an actual distance is determined by error analyzing and statistical methods. The detailed flowchart is shown in FIG. 4.

Figure 4:
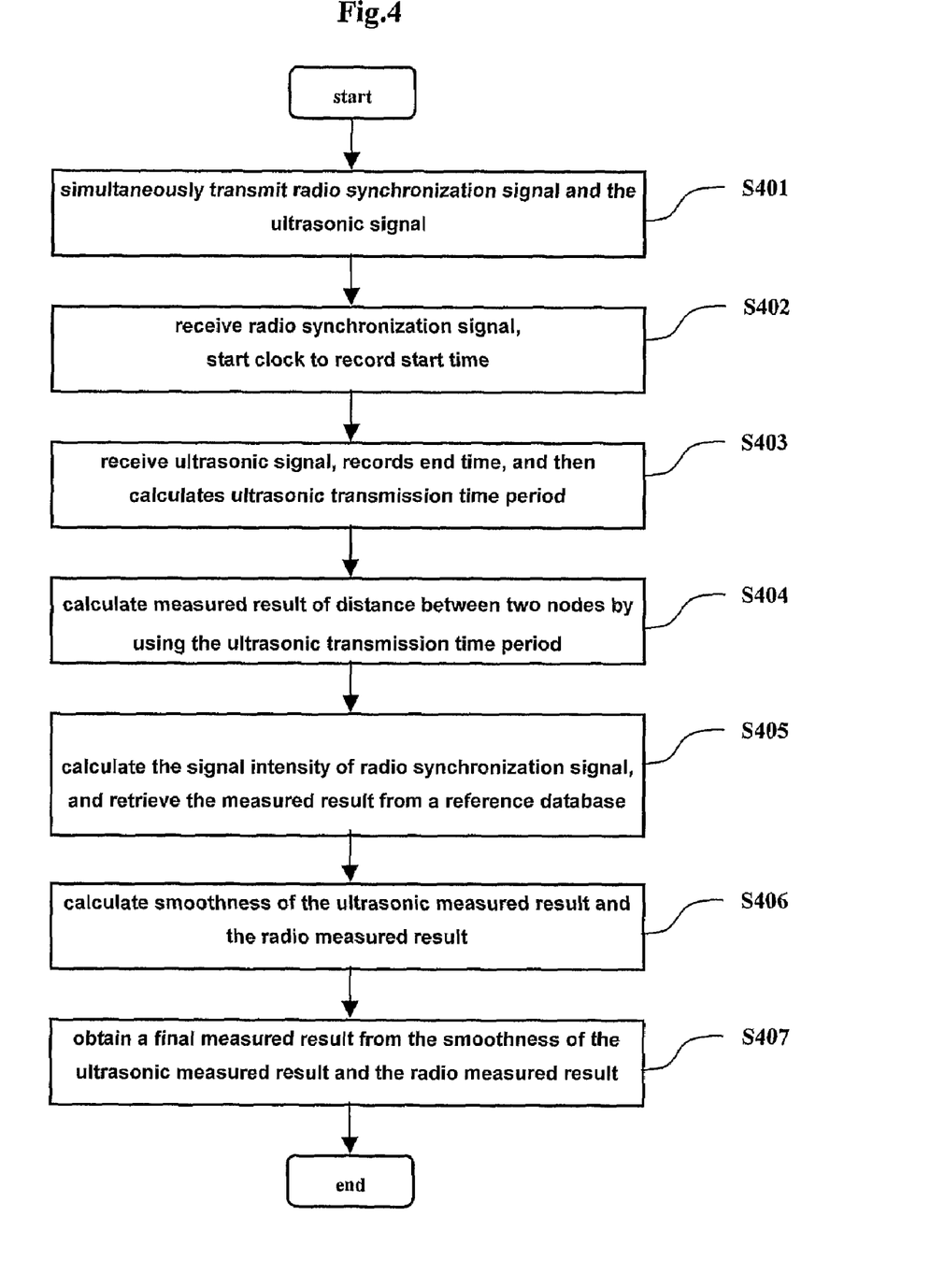
FIG. 4 shows a flowchart for illustrating a hybrid ranging method according to a preferred embodiment of the present invention.

In FIG. 4, the following steps are performed.

S401: a node 1 simultaneously transmits a radio synchronization signal and an ultrasonic signal;

S402: a node 2 receives the radio synchronization signal, starts its internal clock to record a start time $T_s$;

S403: the node 2 receives the ultrasonic signal, records an end time $T_e$, and then the transmission time period of the ultrasonic wave is calculated, $T_D = T_e - T_s$;

S404: the node 2 calculates a ultrasonic measured result $D_{sound} = T_D \times V_{sound}$ of distance between two nodes by using the transmission time period $T_D$ of the ultrasonic wave, in which $V_{sound}$ is the speed of the ultrasonic wave;

S405: the node 2 calculates a signal intensity of the received radio synchronization signal, and retrieves a radio measured result $D_{strength}$ between the node 1 and the node 2 from a reference database;

S406: the node 2 calculates the smoothness of the ultrasonic measured result $D_{sound}$ and the radio measured result $D_{strength}$;

S407: a resulting measured result is obtained from the smoothness of the ultrasonic measured result $D_{sound}$ and the radio measured result $D_{strength}$.

Because the inventive method determines the distance between the two nodes by means of both ultrasonic signal and radio signal intensity, the accuracy of the measurement greatly depends on how to properly process these two kinds of data in order to calculate out more precise measured results. Therefore, the radio measured distance and the ultrasonic measured distance may be respectively judged according the variation of the history data to determine whether any interference exists, in order to effectively obviate the interference data, and the robustness to the interference sources can be further enhanced.

During the ranging by the radio intensity, the intensity is analyzed by directly using the data packets transmitted from the transmitting terminal, and an object for duplicate using one transmitting signal is achieved. Since one packet includes more than 20 bytes, after a plurality of radio intensity signals are received once, the average thereof is used as the measured signal intensity of this time. Meanwhile, the variance of these points is calculated so as to be used as the basis of error analyses. If the variance is large, then it means that during the packet transmission, the quality of the signals is influenced by external inferences. Therefore, whether this measured result is useful or not can be determined by a predetermined variance threshold. The detailed steps are as follows.

1. when one packet is detected, the number of the received signals is initialized, $N_i = 0$;

2. the radio signal i in the packet is received, and the intensity $S_i$ of the radio signal is measured;

3. the number of the radio signals is accumulated, $N_s = N_s + 1$;

4. after the packet is completely received, an average signal intensity is calculated, $$\overline{S} = \frac{\sum_{i=1}^{N_s} S_i}{N_s};$$

5. the signal variance of the packet is calculated, $$E_{sqrt} = \frac{\sqrt{\sum_{i=1}^{N_s}(S_i - \overline{S})^2}}{N_s};$$

6. it is determined whether $\overline{S}$ should be used or not by determining whether $E_{sqrt} > E$ is satisfied, in which E is a predetermined variance threshold;

7. a corresponding distance is retrieved from the reference database according to the determined averaged intensity value.

Similarly, during the ultrasonic ranging, the measured results fluctuate due to the interference to the ultrasonic wave from directionality, barriers and the like. Therefore, if the receiving terminal stores the measured distances in a certain time period, and compares the variation amplitudes of the history data and the present data, the variation amplitude of the measured results can be calculated. For example, the effectiveness of the present data can be determined according to the derivativeness of the data curve, that is, smoothness. If the data curve is smooth and derivative, then it means the present data are effective; whereas if the data curve has steps, then it means the present data are useless.

With respect to the values of radio measured distances, they can be stored and analyzed in the same manner as the ultrasonic wave, and the judgment result indicating whether the present measured result is useful or not can be also obtained. The actual value of the present measurement can be finally determined by this result in combination with the ultrasonic judgment result. That is to say, after obtaining ultrasonic measured result and radio measured result, it is judged which one of these two measured results has the smaller variation, and the measured result having the larger variation is corrected with the one having the smaller variation, and the final measured result is achieved.

Figure 5:
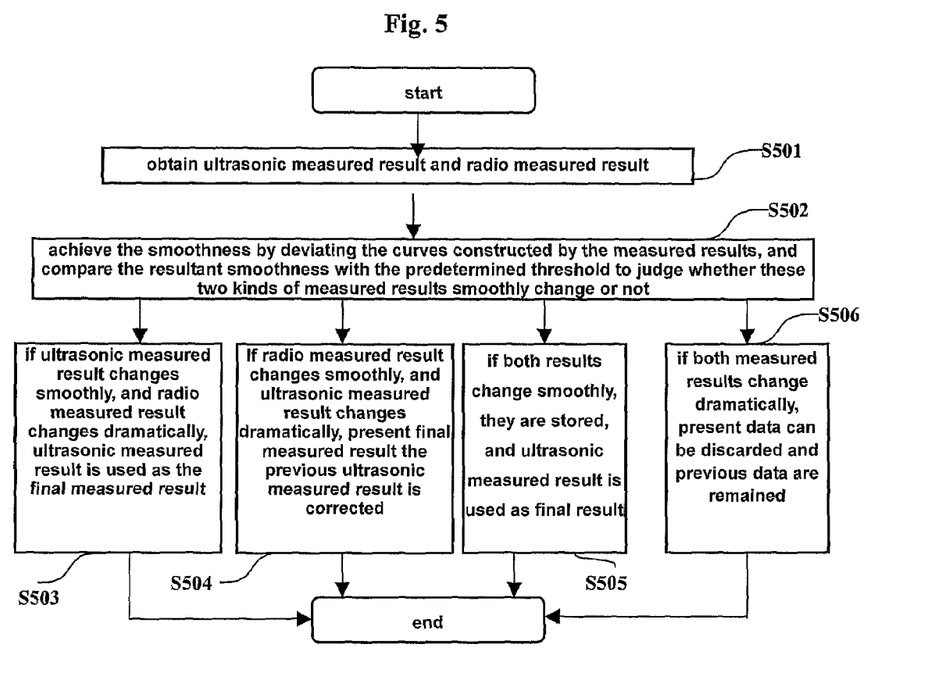
FIG. 5 depicts a synthetic judgment method combining the ultrasonic ranging and the radio ranging.

FIG. 5 depicts a synthetic judgment method combining the ultrasonic ranging and the radio ranging.

S501: ultrasonic measured results and radio measured results are obtained;

S502: the smoothness are achieved by deviating the curves constructed by the measured results, and the resultant smoothness are compared with the predetermined threshold to judge whether these two kinds of measured results smoothly change or not;

S503: if the ultrasonic measured result changes smoothly, and the radio intensity measured result changes dramatically, then it means some electromagnetic interference possibly exists in that environment, and thus the radio intensity measured result is discarded, and the ultrasonic measured result is used as the final measured result;

S504: if the radio intensity measured result changes smoothly, and the ultrasonic measured result changes dramatically, then it means some blocking interference possibly exists in that environment. In this case, the present final measured result $D_i^n$ can a value obtained by correcting the previous ultrasonic measured result $D_{sound}^{n-1}$ with the present radio intensity measured result $D_{radio}^n$ and the previous radio intensity measured result $D_{radio}^{n-1}$ as $D_i^n = D_{sound}^{n-1} + (D_{radio}^n - D_{radio}^{n-1})$;

S505: if both measured results change smoothly, then both measured results are both stored, and the ultrasonic measured result is used as the final result;

S506: if both measured results change dramatically, then it means both electromagnetic and blocking interference possibly exists in the environment. In this case, the present data can be discarded and the previous data are remained.

With the above method, the accuracy of the hybrid ranging can be further enhanced.

As for a sensor node with both ultrasonic and radio communication dual modules, power consumption during communication is an important problem. The sensor node is generally supplied with a battery, and frequently transmitting ultrasonic signals will consume power and thus the usage life of the sensor node is greatly shortened. Therefore, it is a key point for energy saving of the sensor node that the ultrasonic wave must be efficiently used for ranging.

Figure 6:
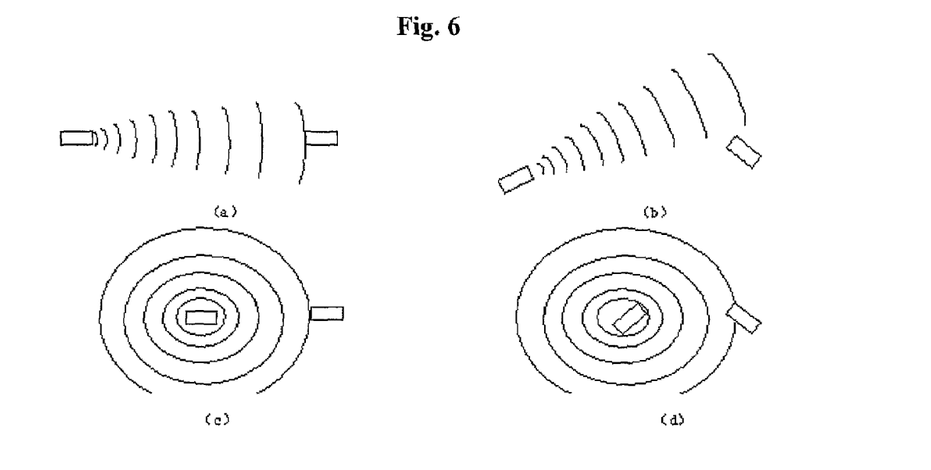
FIG. 6 depicts a diagram illustrating the transmission of the ultrasonic signal and the radio signal under different orientation conditions.

Meanwhile, since ultrasonic wave has strong directionality, it is not appropriate for some specific application. For example, for ranging problem of a moving node, because in movement, the position and orientation of the node inevitably change, a strict facing state between the ultrasonic wave transmitting and receiving terminals can not be hold at any time. When the orientations of the transmitting and receiving terminals are changing, the measured result of the distance therebetween is changing accordingly. Such phenomenon severely influences the accuracy of the measurement. FIG. 6 depicts a diagram illustrating the transmission of the ultrasonic signal and the radio signal under different orientation conditions. In FIG. 6, (a) represents a face-to-face ultrasonic transmission in a usual condition; (b) represents a direction-changing ultrasonic transmission in moving; (c) represents a face-to-face radio transmission in a usual condition; and (d) represents a direction-changing radio transmission in moving.

In the ranging system of the present invention, the distance between nodes is estimated based on the radio intensity signal while performing the ultrasonic signal measurement. Since the power necessary for transmitting the radio signal is far smaller than the ultrasonic wave transmitting power, an object of power saving can be achieved by adjusting a ratio of the transmitting numbers of the ultrasonic waves and radio signals without losing measurement accuracy. Meanwhile, a ranging method using radio signal intensity is not direction sensitive, and thus the estimated value can be used to correct errors due to directionality in a certain degree.

The present invention determines the transmitting radio between the transmission numbers of the ultrasonic signals and radio intensity ranging signals. In the system, in order to fulfill requirements of moving localization, the distance between two nodes has to be periodically measured. Thus, the transmissions of the ultrasonic waves and the radio signals can be controlled by analyzing the variation of multiple measured results. The detailed method is as follows.

Figure 7:
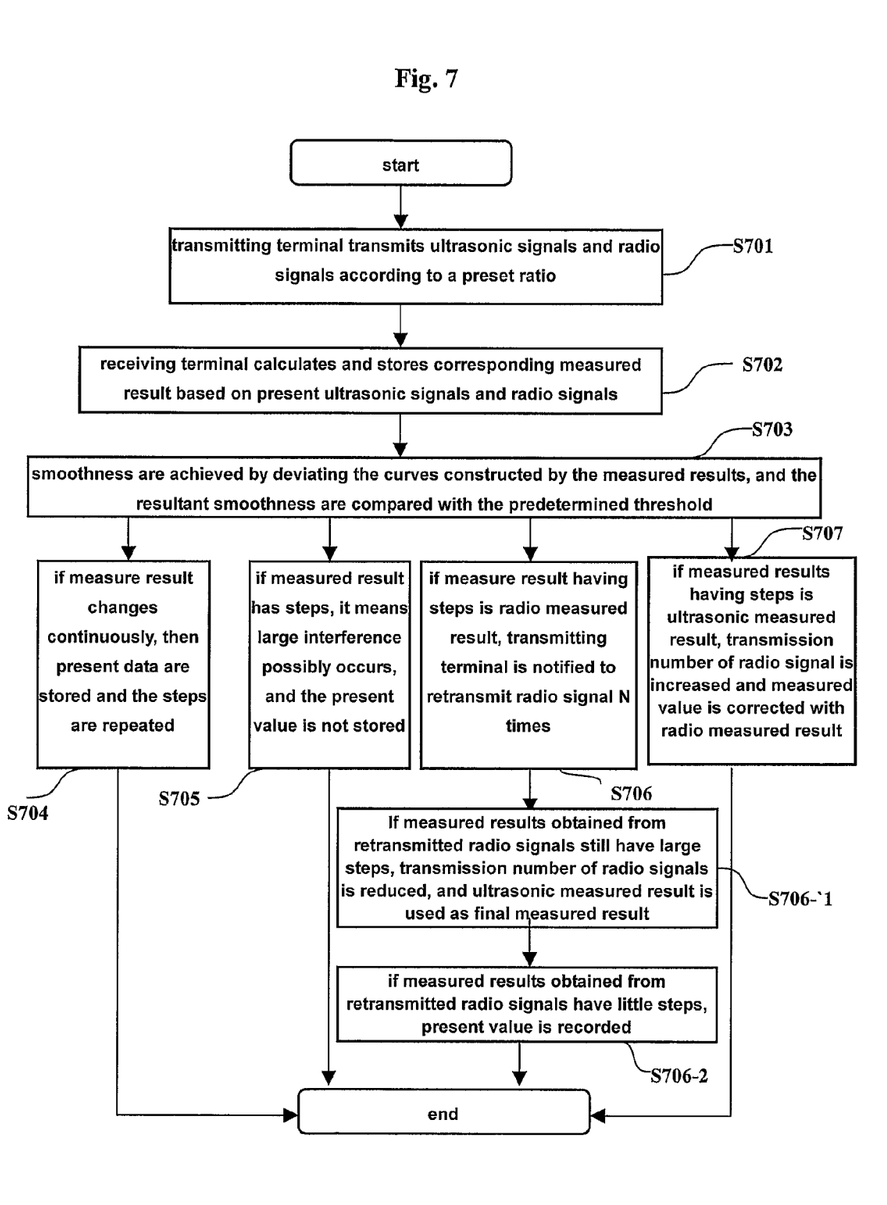
FIG. 7 depicts a flowchart for determining the transmission ratio of transmitting the ultrasonic waves and the radio ranging signals according to the embodiment of the present invention.

FIG. 7 depicts a flowchart for determining the transmission ratio of transmitting the ultrasonic waves and the radio ranging signals according to the embodiment of the present invention.

S701: the transmitting terminal transmits the ultrasonic signals and the radio signals according to a preset ratio. Because the ultrasonic wave consumes more power, generally, the communication number of the ultrasonic signals is set smaller than the number of the radio intensity ranging. For example, $F_{sound}:F_{radio}=1:5$, in this case, one of the 5 radio signals, such as the last one, can be negotiated as the synchronization signal;

S702: the receiving terminal calculates and stores corresponding measured result based on the present ultrasonic signals and radio signals;

S703: the smoothness are achieved by deviating the curves constructed is by the measured results, and the resultant smoothness are compared with the predetermined threshold to judge whether these two kinds of measured results smoothly change or not;

S704: if the measured result changes continuously, then the present data are stored and the above steps are repeated;

S705: if the measured result has steps, then it means large interference possibly occurs, and the present value is not stored;

S706: if the measured result having steps is the radio intensity measured result, then it means some electromagnetic interference sources possibly exist in that environment, at this time, the transmitting terminal is notified to retransmit the radio signal N times;

S706-1) if the measured results obtained from the retransmitted radio signals still have large steps, then it means the interference source may be stationary, and the transmission number of the radio signals is reduced, for example, $F_{sound}:F_{radio}=1:2$, and the ultrasonic measured result is used as the final measured result;

S706-2) if the measured results obtained from the retransmitted radio signals have little steps, then it means the interference source may be a temporary interference source, and the present results are recorded, and the procedures goes on;

S707: if the measured results having steps are the ultrasonic measured results, then the transmission number of the radio signal is increased, for example, the ratio is changed into $F_{sound}:F_{radio}=1:8$, and the measured value is corrected with the radio intensity measured result.

The main idea of implementing the above strategy on the transmitting terminal is in that when the signals are stable, the ultrasonic ranging is replaced with radio intensity ranging as much as possible, and thus the power consumption is reduced by the reduction of the ultrasonic measurement number. At the same time, since the interference sources of these two kinds of propagation media are different (the ultrasonic wave is sensitive to barriers, whereas the radio wave is sensitive to electromagnetic interference sources), the anti-interference ability of the final measured result can be enhanced by increasing the number of the non-influenced measurements in a case of being influenced.

At the receiving terminal, it can be roughly deduced whether there is external interference in the present measured results by comparing and analyzing the history measured data and the present measured data. Through analyses to the interference, the measured results can be used or discarded so as to reduce the errors due to environment interferences.

Because there are interferences such as multi-path and NLOS in a room, the localization accuracy of RSSI is low in the room. For increasing the accuracy, an environment database generally needs to be established in advance. The specific implementing method is to firstly measure the distances among some nodes with known positions, evaluate the errors due to the environment, and store these errors in the database. When the distance between nodes is actually measured, the actually measured error is corrected by analyzing the errors in the database so as to obtain a precise distance value.

Figure 8:
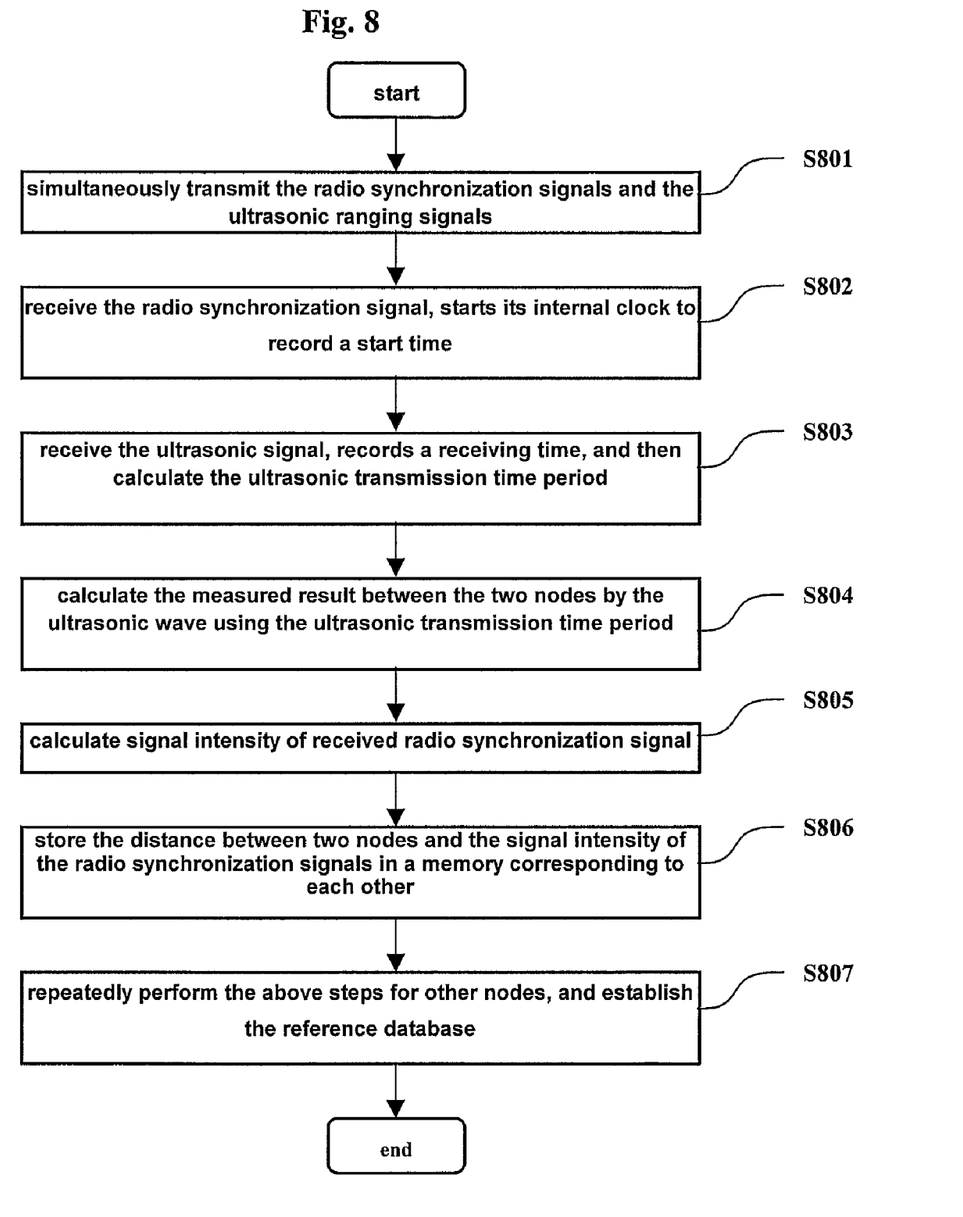
FIG. 8 depicts a flowchart of the method for establishing a reference database according to the embodiment of the present invention.

An obvious disadvantage of the above ranging method is in that a lot of nodes is necessary disposed at known positions in advance, a database needs to be pre-established, and the contents of the database can not change with the change of the environment. For overcoming this disadvantage, a method for establishing and updating a database by ultrasonic ranging is proposed. FIG. 8 depicts a flowchart of the method for establishing a reference database according to the embodiment of the present invention.

S801: the radio synchronization signals and the ultrasonic ranging signals are transmitted from the node 1 simultaneously;

S802: the node 2 clocks when receiving the radio synchronization signals, and records a start time $T_s$, S803: the node 2 records an end time $T_e$ when receiving the ultrasonic ranging signals, and then the ultrasonic transmission time period is calculated, $T_D=T_e-T_s$;

S804: the distance D between the node 1 and the node 2 is calculated according to the following equation:

$$D=T_D \times V_{sound},$$

in which $V_{sound}$ is the speed of the ultrasonic wave;

S805: the node 2 calculates the signal intensity of the received radio synchronization signal;

S806: the distance D between the node 1 and the node 2 and the signal intensity of the radio synchronization signals are stored in a memory corresponding to each other;

S807: the above steps are repeatedly performed for other nodes, and the reference database is established.

A main advantage of the ultrasonic ranging in indoor localization is high accuracy and less influenced by indoor environment. Indoors, the accuracy of the ultrasonic ranging is about 1 cm within a range up to 10 m, and about 5 cm within a range more than 10 m. From a non-blocking ultrasonic ranging and using its results as the actual distances among nodes, the initial database necessary for the radio intensity ranging can be easily established. At the same time, when environment changes, the contents in the database can be dynamically updated on the basis of the ultrasonic measured results. Thus, the whole system not only reduces a burden of initial installation, but also enhances the adaptability of the system to the environment changes.

Hereto, the present invention has already been described with the preferred embodiments thereof. It should be understood by those skilled in the art, many variations, substitutions and additions are possible without departing from the spirits and scopes of the present invention. Therefore, the scopes of the invention should not be construed to be limited to the above specific embodiments but should be limited by the appended claims.

What is claimed is:

1. A hybrid ranging method comprising the steps of:
    transmitting from a first node an ultrasonic signal and a radio signal comprising at least one radio synchronization signal with a predetermined ratio therebetween;
    calculating, at a second node, a ultrasonic transmission time period between the receipt of the radio synchronization signal and the receipt of the ultrasonic signal;
    calculating, at the second node, an ultrasonic measured result between the first node and the second node by using the ultrasonic transmission time period;
    calculating, at the second node, the strength of the received radio signal, and obtaining a radio measured result between the first node and the second node from a reference database;

calculating, at the second node, the smoothness of the ultrasonic measured result and the radio measured result; and determining, at the second node, a final measured result according to the smoothness of the ultrasonic measured result and the radio measured result.

2. The hybrid ranging method as claim 1, further comprising the step of:

adjusting, at the second node, the ratio between ultrasonic signals and the radio signals on the basis of the smoothness of the ultrasonic measured result and the radio measured result.

3. The hybrid ranging method as claim 1 or 2, wherein the second node calculates the smoothness of the ultrasonic measured result and the radio measured result by deviating the curve constructed by the ultrasonic measured results and the radio measured results.

4. The hybrid ranging method as claim 3, wherein the step of determining, at the second node, a final measured result according to the smoothness of the ultrasonic measured result and the radio measured result comprising:

comparing the smoothness with a predetermined threshold to judge whether these measured results smoothly change or not;

discarding the radio intensity measured result and using the ultrasonic measured result as the final measured result if the ultrasonic measured result changes smoothly and the radio measured result changes dramatically;

obtaining the final measured result $D_i^n$ by correcting the previous ultrasonic measured result $D_{sound}^{n-1}$ with the present radio intensity measured result $D_{radio}^n$ and the previous radio intensity measured result $D_{radio}^{n-1}$ if the radio measured result changes smoothly, and the ultrasonic measured result changes dramatically;

storing both measured results if both measured results change smoothly, and using the ultrasonic measured result as the final result; and discarding the present results if both measured results change dramatically, and holding the previous result.

5. The hybrid ranging method as claim 4, wherein the correction of $D_{sound}^{n-1}$ is performed by the following to obtain the final measured result:

$$D_i^n = D_{sound}^{n-1} + (D_{radio}^n - D_{radio}^{n-1}).$$

6. The hybrid ranging method as claim 3, wherein the step of adjusting, at the second node, the ratio between ultrasonic signals and the radio signals on the basis of the smoothness of the ultrasonic measured result and the radio measured result comprising:

judging whether the ultrasonic measured result and the radio measured result change smoothly by comparing the smoothness with the predetermined threshold;

storing the present measured result if change is smooth;

discarding the present measured result if change is dramatically;

increasing the number of transmitting the radio signals if the radio measured results change dramatically and correcting the previous ultrasonic measured result $D_{sound}^{n-1}$ with the present radio intensity measured result $D_{radio}^n$ and the previous radio intensity measured result $D_{radio}^{n-1}$.

7. The hybrid ranging method as claim 6, wherein if the retransmitted radio measured result changes dramatically, the number of transmitting the radio signals is decreased, the ultrasonic measured result is used as the final measured result;

storing the present results if the measured results obtained from the retransmitted radio signals have little steps.

8. The hybrid ranging method as claim 6, wherein the correction of $D_{sound}^{n-1}$ is performed by the following to obtain the final measured result:

$$D_i^n = D_{sound}^{n-1} + (D_{radio}^n - D_{radio}^{n-1}).$$

9. The hybrid ranging method as claim 1, wherein the step of calculating, at a second node, a ultrasonic transmission time period between the receipt of the radio synchronization signal and the receipt of the ultrasonic signal comprising:

starting, at the second node, a clock to get the time when the radio synchronization signal is received as a start time;

stopping, at the second node, the clock to get the time when the ultrasonic signal is received as an end time, and then calculating the ultrasonic transmission time period by subtracting the start time from the end time.

10. The hybrid ranging method as claim 1 or 9, wherein the step of calculating, at the second node, an ultrasonic measured result between the first node and the second node by using the ultrasonic transmission time period comprising:

calculating the ultrasonic measured result by multiply the ultrasonic transmission time period with the speed of the ultrasonic speed.

11. The hybrid ranging method as claim 1, wherein the step of calculating, at the second node, the strength of the received radio signal comprising:

calculating the average of the strength of the received radio signals as a final radio signal strength.

12. The hybrid ranging method as claim 11, wherein, calculating variance of the signal strength;

using the average of the radio signals whose variance larger than a predetermined variance value as the final strength.

* * * * *